US012678874B2

(12) United States Patent
Trachsel et al.

(10) Patent No.: US 12,678,874 B2
(45) Date of Patent: Jul. 14, 2026

(54) HOB CUTTER ARRANGEMENT

(71) Applicant: Diametal A.G., Biel/Bienne (CH)

(72) Inventors: Alessandro Pierre Emile Trachsel, Bienne (CH); Nils Vuilleumier, Bienne (CH); Frédéric Marin, Ins (CH)

(73) Assignee: Diametal A.G., Biel/Bienne (CH)

( * ) Notice: Subject to any disclaimer, the term of this patent is extended or adjusted under 35 U.S.C. 154(b) by 687 days.

(21) Appl. No.: 18/014,632

(22) PCT Filed: May 11, 2021

(86) PCT No.: PCT/EP2021/025178
§ 371 (c)(1),
(2) Date: Jan. 5, 2023

(87) PCT Pub. No.: WO2022/008094
PCT Pub. Date: Jan. 13, 2022

(65) Prior Publication Data
US 2023/0256529 A1 Aug. 17, 2023

(30) Foreign Application Priority Data
Jul. 8, 2020 (EP) ..................................... 20020315

(51) Int. Cl.
*B23F 21/16* (2006.01)
*B23F 23/12* (2006.01)
(52) U.S. Cl.
CPC .......... *B23F 21/16* (2013.01); *B23F 23/1243* (2013.01)
(58) Field of Classification Search
CPC .. B23F 9/08; B23F 9/082; B23F 9/084; B23F 9/086; B23F 9/088; B23F 23/1243;
(Continued)

(56) References Cited

U.S. PATENT DOCUMENTS 4,137,822 A * 2/1979 Behnke ............... B23F 23/1243
409/234
4,759,113 A * 7/1988 Hunkeler ............ B23F 23/1212
483/18
(Continued)

FOREIGN PATENT DOCUMENTS

CN 104588785 A 5/2015
CN 109079261 A 12/2018
(Continued)

OTHER PUBLICATIONS

International Search Report dated Jul. 23, 2021 for copending International App. No. PCT/EP2021/025178.

*Primary Examiner* — Nicole N Ramos
(74) *Attorney, Agent, or Firm* — FisherBroyles, LLP; Douglas P. LaLone

(57) ABSTRACT

A hob cutter arrangement includes a tool body which has a continuous axial bore, conical bore sections forming both ends of the axial bore, an end shank body at each end of the tool body, and a conical section inserted into the conical bore section. Each end shank body has a radial flange which can be placed against an end face of the tool body and a shaft section on the side of the flange opposite the conical section for clamping in a machine tool. An axle connects the end shank bodies and clamps them together. The end shank bodies are provided with blind holes opening towards the axle and provided with threads to the axle. Elastic elements are clamped between a central section of the axle and a front side of the end shank body on both sides of the axle.

6 Claims, 6 Drawing Sheets

(58) Field of Classification Search
CPC .... B23F 11/00; B23F 5/22; B23F 5/24; B23F
21/16; B23F 21/163; B23F 21/166; B23F
21/18; B23F 21/183; B23F 21/186
See application file for complete search history.

(56) References Cited

U.S. PATENT DOCUMENTS

| | | | | |
|---|---|---|---|---|
| 5,192,172 | A * | 3/1993 | Lunazzi | B23F 23/1212 |
| | | | | 409/232 |
| 6,325,573 | B1 | 12/2001 | Carmincke | |
| 9,550,244 | B2 | 1/2017 | Maringer | |
| 2003/0017013 | A1 | 1/2003 | Soltau | |
| 2006/0261562 | A1* | 11/2006 | Woodyard | B23B 31/40 |
| | | | | 279/4.01 |
| 2011/0243671 | A1 | 10/2011 | Kretschmer | |
| 2015/0239054 | A1 | 8/2015 | Maringer | |

FOREIGN PATENT DOCUMENTS

| | | | | |
|---|---|---|---|---|
| DE | 2137396 | A1 * | 2/1973 | |
| DE | 19860403 | A1 | 7/2000 | |
| DE | 102018107453 | A1 | 5/2019 | |
| EP | 1279455 | A1 | 1/2003 | |
| EP | 2712694 | B1 | 4/2014 | |
| JP | 2016175135 | A | 10/2016 | |
| SU | 724281 | A1 * | 3/1980 | |

* cited by examiner

HOB CUTTER ARRANGEMENT

CROSS-REFERENCE TO RELATED APPLICATIONS

This application claims priority to International Patent Application No. PCT/EP2021/025178, filed on May 11, 2021, and European Patent Application No. EP20020315.6, filed on Jul. 8, 2020, the contents of which are hereby incorporated by reference in their entirety.

TECHNICAL FIELD

The disclosure relates to a hob cutter arrangement with a tool body which is at least partially formed from a cutting material, and which has a continuous axial bore, conical bore sections forming both ends of the axial bore, an end shank body, respectively, at each end of the tool body, adapted for coupling with the hobbing machine, and which has a conical section inserted fittingly into the conical bore section, and which has a radial flange which can be placed against the end face of the tool body when the section is seated in the bore section, and which end shank body has a shaft section on the side of the flange opposite the conical section for clamping in a machine tool, with an axle connecting the end shank bodies, which is adapted to clamp the end shank bodies together and bias the conical sections into the bore sections, and which is provided with at least partly threaded end sections.

BACKGROUND

As is known, hobbing cutters first and foremost are used for manufacturing toothed components such as gears, worn gears, racks and the like, from a blank, for instance a 1 mm module. The main constituent parts of such hob cutters are a cutting part, for cutting the pinion, and typically two cutting part—machine interfaces, one on the drive side and one on the free side or guide side. The interfaces can take different forms, for instance cylindrical, conical, with one or two flats, etc. An intermediate element, for example a hollow shaft taper (HSK), provides for the connection between the side with the drive interface and the hob cutting machine drive spindle.

For hobbing cutters, a general distinction is made, with respect to their seating in a hobbing machine, between a bore-type design and a shank-type design. In the bore-type design, the through axial bore of the tool body is provided with a longitudinal groove for a positive torque transmission. However, a bore design using frictional transmission at the front-end face is known as well. Hobbing cutters of the bore-type design are used, first and foremost, for series production and lower requirements to workpiece precision. Usually, hobbing cutters are formed from high-speed steel. However, it is also known to manufacture the hobbing cutter from sintered carbide.

In the shank-type design, shanks are formed at the ends of the tool body for a non-positive torque transmission. The shanks may be tapered on the two sides or tapered on one side or may be cylindrical on one side or the two sides. The shanks may be hollow, and the tapered shanks may also be designed as steep-angle tapers. Hobbing cutters of the shank-type design are primarily used for high requirements to quality, which presupposes a high truth of running. The disadvantage, however, is that their manufacture involves relative high expenditure, specifically if the tool body is made from sintered carbide. Milling cutters made of sintered carbide are extremely sensitive to shocks and bumps. If the cutter is damaged it frequently requires replacement.

DE 19860403 A1 has made known a hob cutter assembly composed of a tool body and a mounting mandrel in which the tool body is provided with an axial bore the ends of which have ground cylindrical centering surfaces. The mandrel extending through the bore has complementary seating surfaces. The space between the centering and seating surfaces has disposed therein a sleeve-shaped cage which is of a thickness which is smaller than the radial distance between the centering and seating surfaces, and of an outer diameter which is smaller than the inner diameter of the centering surfaces. In a circumferential direction, at least one series of preferably metallic biasing members are supported in the cage and are in a contact with the associated seating surface and the seating surface. The diameter and the distance between the bearing points or bearing lines of the biasing members is slightly larger than the radial distance of the centering and seating surfaces. At one end, the mandrel has a threaded portion onto which a hydraulically acting clamping nut can be screwed which acts on a front-end face of the cutter body via a ring while a collar of the mounting mandrels bears on the other front-end face of the tool body at the opposed end. The tool body is axially located on the mandrel in this way. In place of the sleeve-shaped cages, a clamping sleeve may be provided which is radially expandable hydraulically and acts between the centering and seating surfaces. The assembly described is intended to allow a high truth of running with no need to accept the disadvantages of a shank-type design. Nevertheless, the assembly described involves relatively great expenditure.

EP 2712694 B1 discloses a tool holder for a hob in a bore design with a clamping device provided between a spindle and a counter-holder, which has a centering clamping piece that can be engaged in particular in the hob and a receiving mandrel which can be engaged in the hob and is clamped to the centering clamping piece for clamping the hob, the centering clamping piece and the holding mandrel each have a flange. The flanges each have a radial actuator with at least one actuator which can be adjusted against the spindle or the counter-holder, store for centering the clamping device. The centering clamping piece and/or the holding mandrel can have an inner cone on which an outer cone of the respective clamping element is present.

DE1020181074453A1 provides a hobbing device that is provided with the hob, an arbor and a nut. A shaft part of the arbor has a head part which is formed on one end side and an externally threaded part which is formed on the other end side and to which the nut is fastened. An insertion hole of the hob has a first enlarged-diameter hole part formed at one end and coming into contact with the head part and a second enlarged-diameter hole part formed at the other end. The outer diameter of the head part increases in the axial direction as it approaches one end side. The inner diameter of the first hole part with an enlarged diameter of the hob increases in the axial direction as it approaches one end side. The nut is designed as a spherical surface and has a contact surface, which comes into contact with the second hole part with an enlarged diameter of the hob. The inner diameter of the second enlarged diameter hole part increases in the axial direction as it approaches the other end side.

EP 1279455 A1 discloses two conically tapered and interchangeable end shank bodies, inserted into the complementarily tapered end sections of the tool body, which is at least partially formed from a cutting material and which has a continuous axial bore. End shank bodies on each end of the tool body have axial through-bores and are connected by an axial tensioning rod, each of them has a section which can be inserted approximately fittingly into the bore end section of the tool body. A clamping bar is set in bores of the tool body, and the shank bodies. The bar threaded ends engage with respective female threaded portion such that when relatively rotated, allows the shank bodies to be drawn into the tool body and are tightened towards each other. A radial flange on each end shank piece abuts the front-end face of the tool body upon insertion of tapered portion in tool body open. The internal thread sections in the end shank pieces are arranged at a distance from the outer end of the axial bore, and the external thread sections are arranged at the ends of the tensioning rod. The tool body is formed in one piece from hard metal.

OVERVIEW

An objective sought with this design is to be able to ensure a direct coupling between the cutting machine spindle and the hob cutter. Further, the precision of the shank type design should be combined with high flexibility regarding the mounting conditions.

To achieve this objective, the hob cutter arrangement according to the present disclosure is characterized in that at least one of the end shank bodies are provided with blind holes for insertion of the end sections of the axle and which are provided with complementary threads to the central axle, and that elastic elements are clamped between a central section of the axle and the front side of the end shank body on both sides of the axle. Most preferred, both end shank pieces are provided as explained above.

The idea is to replace the solid carbide hob cutter with a hob cutter with drive and guide shank pieces that can be made from other materials. The arrangement according to the present disclosure can ensure a direct coupling between the cutting machine spindle and the hob cutter. For this, preferably a hollow shaft taper (HSK) type interface in hardened steel is provided on the drive side of the cutter, which is not possible with a solid carbide hob cutter. Other advantages of such a design are the interchangeability of the cutting part. Once the interfaces are available, it is enough to replace only the cutting part of the hob cutter. On the other hand, one and the same cutting part can be assembled with different interfaces dedicated for different machines. The installation of the cutting part can be done directly by the user with the interfaces available to him, with the help of appropriate tooling and according to his needs. Further advantages are the possibility of standardization and simplification of manufacturing, reduction of manufacturing costs, environmental impact and reduction of the weight of the hob cutter.

According to a preferred embodiment, the hob cutter arrangement is further characterized in that the axle has a central section with an outer diameter corresponding at maximum to the inner diameter of the central section of the tool body.

Preferably, the axle has a central section with an outer diameter smaller than the inner diameter of the central section of the tool body.

Another preferred embodiment is characterized in that at least one circumferential coupling arrangement between the axle and the tool body is located in the central section. That means a rotationally rigid coupling between the axle and the tool body, for rotationally also driving the tool body when the axle is rotationally driven by the drive arrangement of the hobbing machine.

An advantageous alternative of such embodiment is characterized in that the coupling arrangement consists in a positive connection. This connection is preferably realized with a longitudinal groove in preferably the inner surface of the tool body and a longitudinal ridge preferably on the surface of the axle.

Further, this alternative can have a longitudinal ridge formed by an insert piece received in a longitudinal groove of the axle, preferably fixed by a locking screw.

Another preferred embodiment of the disclosure is characterized in that the axle has sections with smaller diameter than the central section and adjacent to the central section, with pressure springs fit onto said sections, for acting on the end shank pieces. These springs are clamped between the central section of the axle and the front ends of the end shank pieces, biasing the end shank pieces with a force acting away from the center section of the axle.

Another preferred embodiment is characterized in that each end shank piece is provided with at least one locking screw cooperating with the end section of the axle. Said end section can be threaded over its overall length or only over part of that length.

Finally, still another hob cutter arrangement according to the disclosure can show a clamping ring that is inserted between the flange of the end shank body and the end of the tool body on each side of the tool body.

BRIEF DESCRIPTION OF THE DRAWINGS

The disclosure will be explained in greater detail below with reference to an embodiment shown in the drawings.

DETAILED DESCRIPTION

While this disclosure may be embodied in many different forms, there are described in detail herein a specific preferred embodiment of the disclosure. This description is an exemplification of the principles of the disclosure and is not intended to limit the disclosure to the particular embodiment illustrated.

Figure 1:
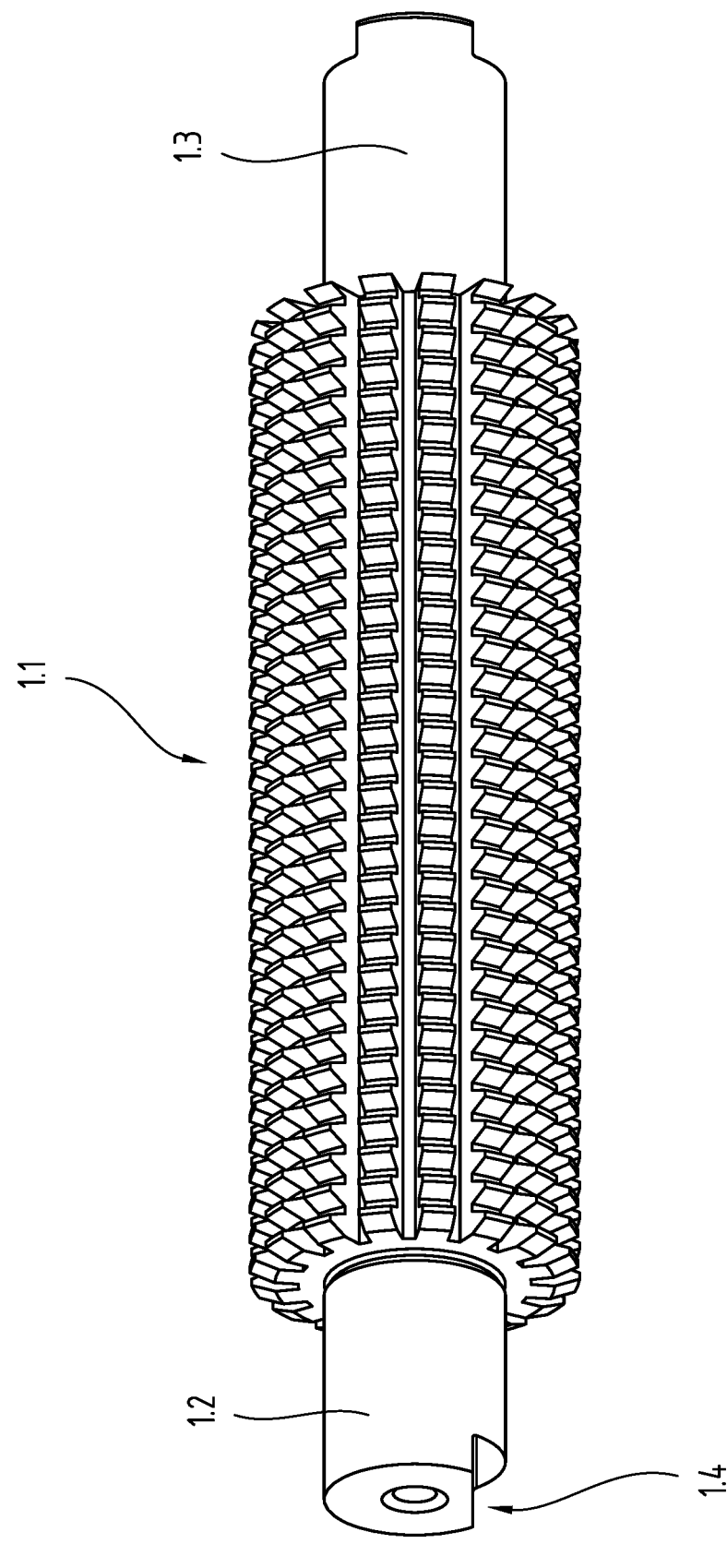
FIG. 1 shows a single-piece hobbing cutter according to the prior art.
Figure 2:
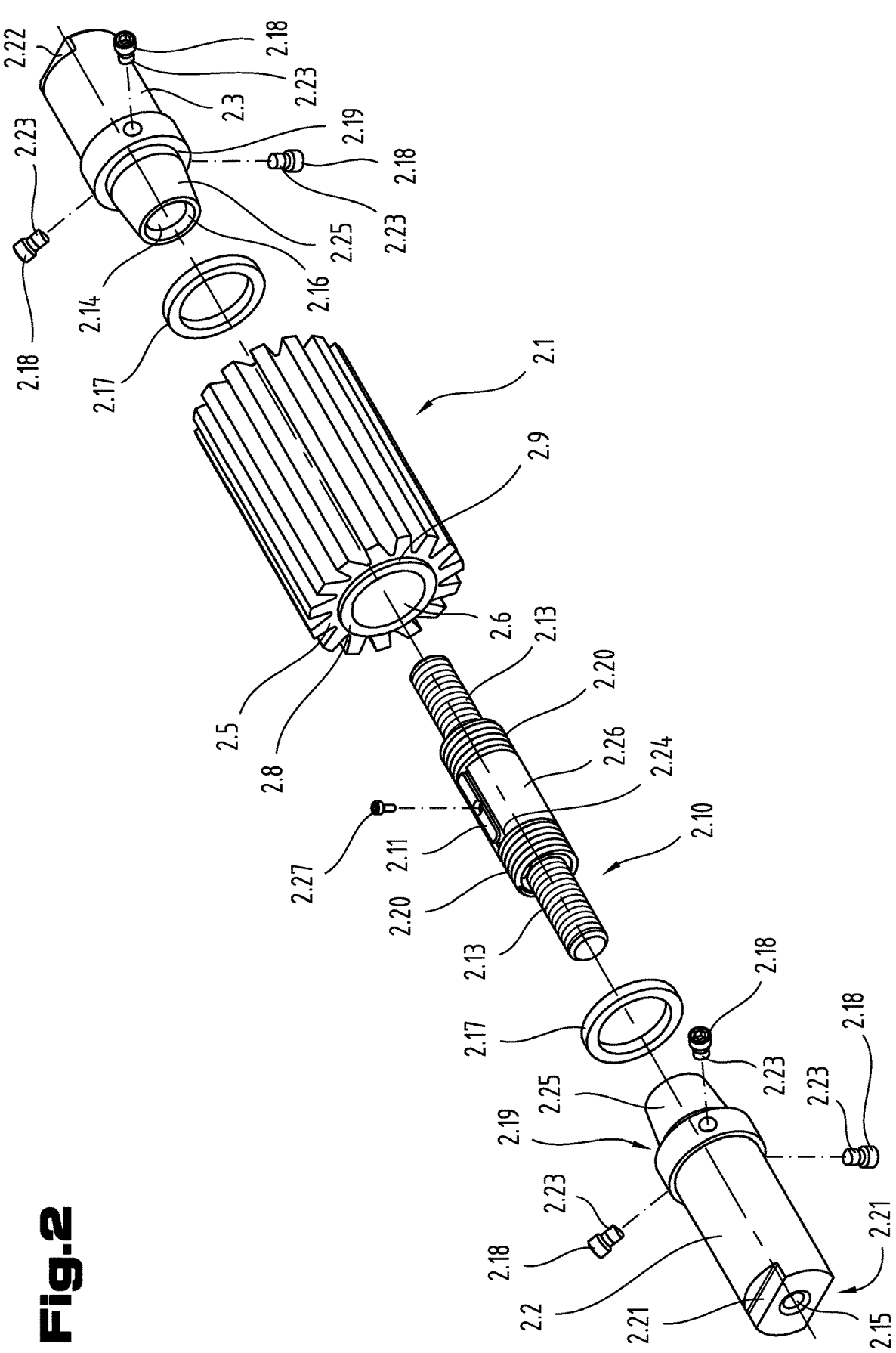
FIG. 2 shows an explosion view of an exemplary embodiment of a hob cutter arrangement according the disclosure.
Figure 3:
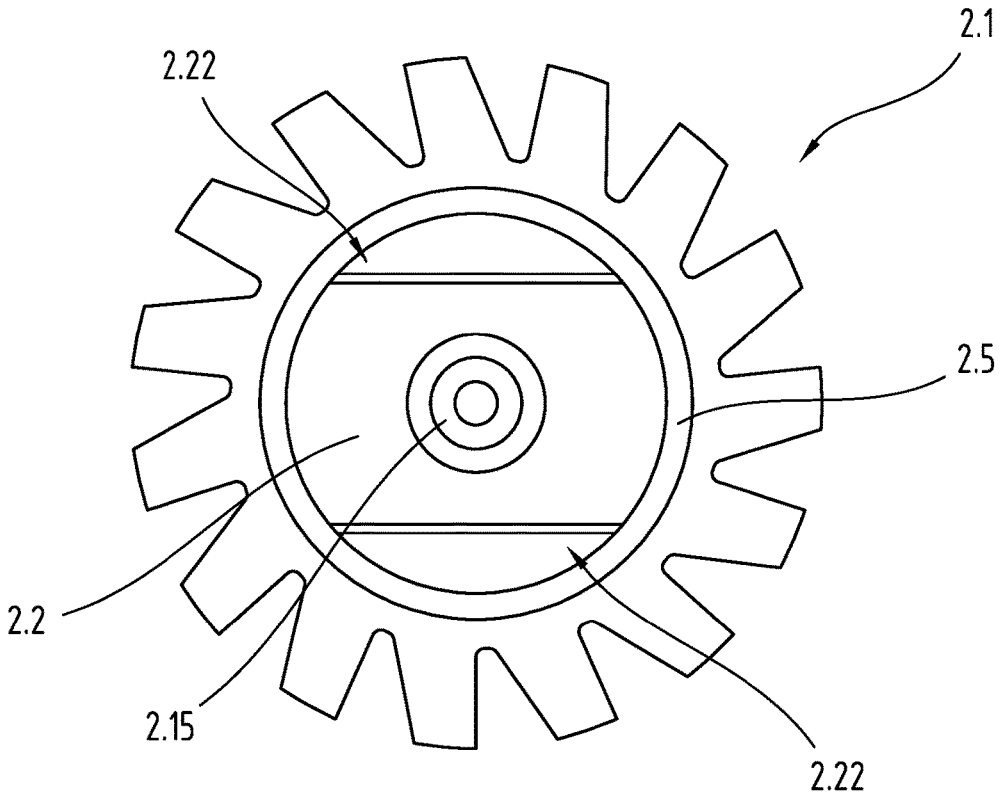
FIG. 3 shows an axial front view of the hob cutter arrangement of FIG. 2.

The prior art hob cutters, as depicted in FIG. 1, consist mainly of a cutting part 1.1 of solid carbide, with cutting part—machine interfaces 1.2, 1.3. One interface 1.2 is coupled to the drive side of the machine and the other interface 1.3 is used as a guide element.

The main element of the hybrid hob cutter according to the present disclosure, a preferred embodiment shown in FIGS. 2 to 8, is a tool body 2.1 made from carbide cutting material. End shank pieces 2.2 and 2.3 as the tool body—machine interfaces are made of hardened steel. Thus, each of these elements is made from the most suitable material for the respective purpose. One end shank piece 2.2 is coupled to the drive side of the machine and can be for instance designed with at least one flat at the outer end opposite the tool body side. The other end shank piece 2.3 is used as a guide element and could also show at least one flat, preferably two flats 2.22. The shaft sections of the end shank pieces 2.2 and 2.3 are shaped depending on the machine the hob cutter arrangement is used for.

Further, the tool body 2.1 has a cutting portion 2.5 on which the cutting teeth are provided and an axial bore 2.6, the inner surface of which bore 2.6 can remain unworked and raw but could also be grinded. In a preferred embodiment, at least one axial groove 2.12 is provided in the bore 2.6 (for coupling with the axle by an insert piece 2.11, see FIGS. 6 to 8).

Figure 5:
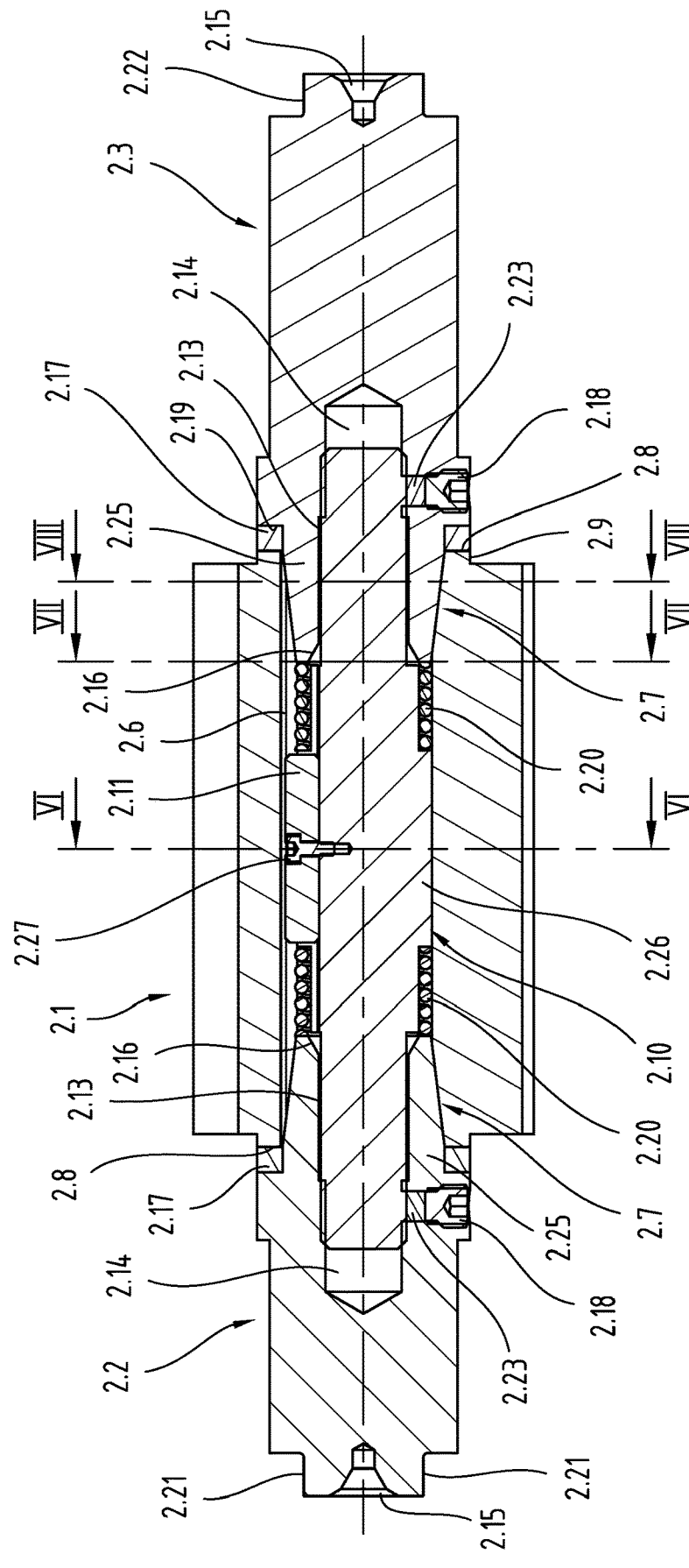
FIG. 5 shows a longitudinal section of the hob cutter arrangement according to FIG. 2.
Figure 6:
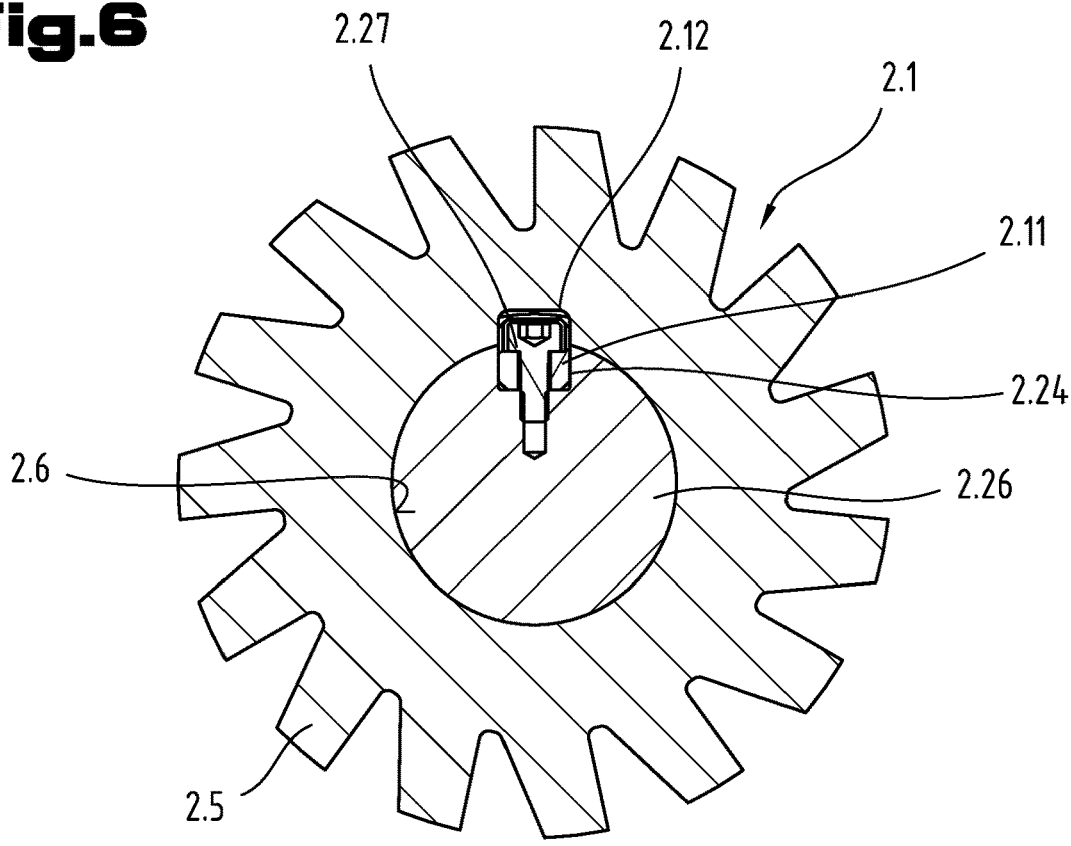
FIG. 6 shows a cross section along line VI-VI in FIG. 5, seen in the direction of the arrows.
Figure 7:
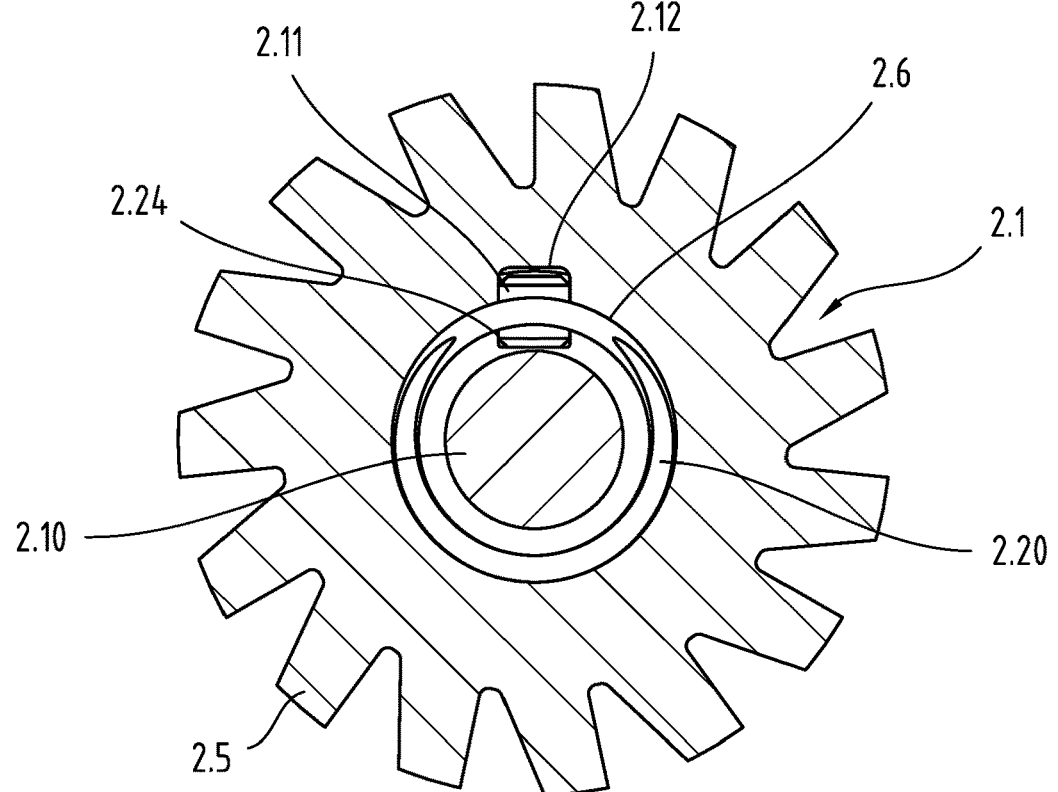
FIG. 7 shows a cross section along line VII-VII in FIG. 5, seen in the direction of the arrows.
Figure 8:
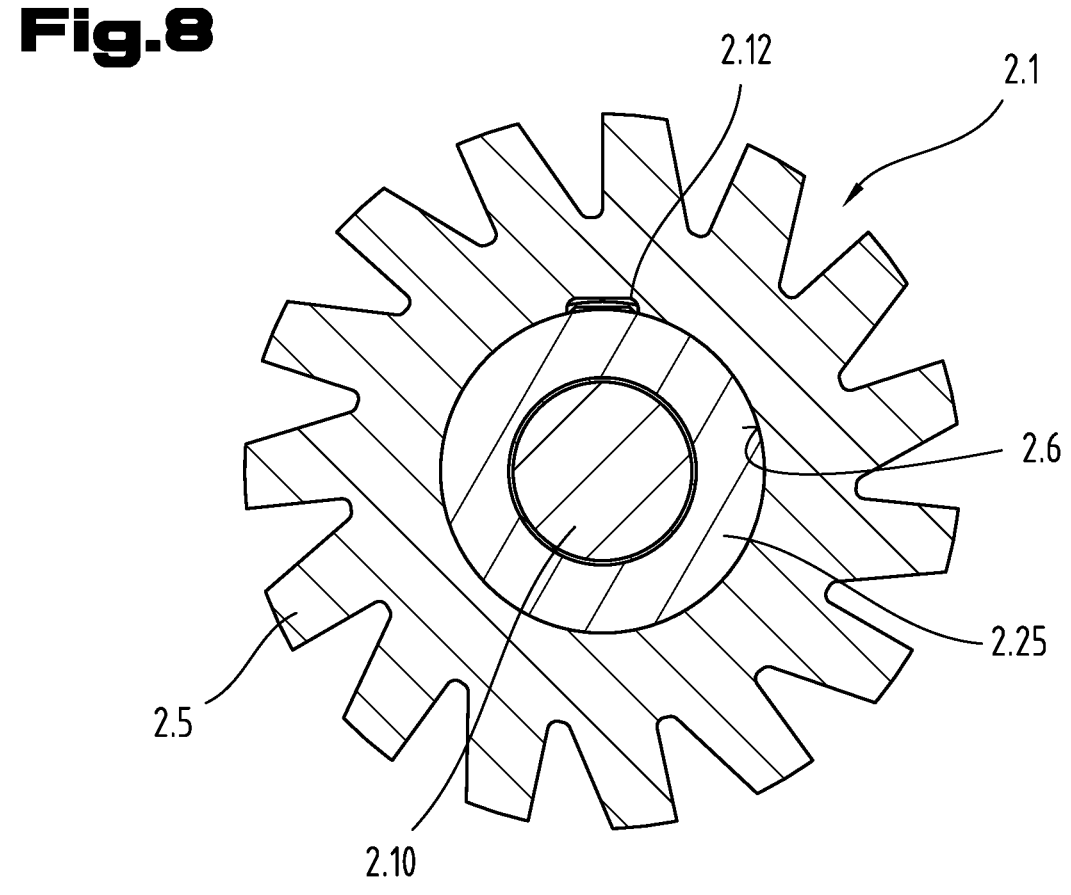
FIG. 8 shows a cross section along line VIII-VIII in FIG. 5, seen in the direction of the arrows.

The two end sections 2.7 of the bore 2.6 in the tool body 2.1 are tapered, preferably with an angle between 5 and 25°, most preferably with an angle of 14°, as can be seen best in FIG. 5. These ranges allow for the best combination of centering properties and fixation by the end shank pieces 2.2 and 2.3 and their corresponding cones 2.25 (as explained below).

The two bearing faces 2.8 of the tool body 2.1 are rectified perpendicular to the axis of the tool body 2.1 and the two tapered end sections 2.7. Test collars 2.9 are provided adjacent to the cutting portion 2.5 of the tool body 2.1.

A hardened steel pin is provided as the axle 2.10 of the hob cutting arrangement with at least partly threaded sections 2.13 at both ends. Preferred is an embodiment with end sections 2.13 threaded preferably over their whole length. Further, at least one axial groove 2.24 (seen better in FIGS. 6 and 7) is provided on the outer surface of the axle 2.10, for coupling with the tool body 2.1 by an insert piece 2.11, which engages with both grooves 2.12 and 2.24 and thereby couples the axle 2.10 with the tool body 2.1. The insert piece 2.11 is secured and fixed in the groove 2.24 by a screw 2.27. Rotation of the axle 2.10 also rotates the tool body 2.1, even without contact of the inner surface of the tool body 2.1 and the outer surface of the axle 2.10, as the largest outer diameter is preferably smaller than the minimum inner diameter of the tool body 2.1, and can be at maximum corresponding to the minimum inner diameter of the tool body 2.1, to allow for easy assembling the tool body 2.1 and the steel pin as the axle 2.10 by inserting the steel pin in the axial bore 2.6.

The end shank piece 2.2 is built for coupling the hob cutter arrangement with the drive section of the hob cutting machine. One end of the end shank piece 2.2 has a centering cone 2.25 with a complementary angle to those of the tapered section 2.7 of the bore 2.6 of the tool body 2.1. The angle of the conical section lies preferably between 5 and 25° and is most preferred being 14°. The conical section 2.25 is further provided with a blind hole 2.14 with a section with an inner thread designed, opening towards the axle 2.10 and located to be connected to the threaded end section 2.13 of the axle 2.10. Thus, this is allowing an adjusting and clamping action of the tool body 2.1 by adjusting the distance of the end shank pieces 2.2 and 2.3 on the axle 2.10 by screwing them onto the end sections 2.13 or screwing them in the other direction.

The end shank piece 2.3 on the opposite side is structured in the same way as end shank piece 2.2, with respect to its inner side for coupling with the tool body 2.1 and the threaded end section 2.13 of the axle 2.10. The portion of the end shank piece 2.3 opposite the cone 2.25 is adapted to the function of this end shank piece 2.3 as a guide piece in the hobbing machine.

Before assembling, the end shank pieces 2.2 and 2.3 are completely machined between their outer end points thanks to two center holes 2.15 (see FIG. 3) and 2.16, so as to result in an outer geometry of the arrangement having a theoretical runout of Zero, and to guarantee on optimum concentricity. The tightening of the tool body 2.1 and its end shank pieces 2.2, 2.3 is made by screwing. It is a cone-to-face clamping. Centering is ensured by the conical surfaces 2.7 of the bore 2.6 and the cone sections 2.25 of the end shank pieces 2.2 and 2.3.

Between the front surfaces 2.19 of the end shank pieces 2.2, 2.3 and the front surface 2.8 of the tool body 2.1 deformable washers 2.17 are inserted, which ensure an optimal tightening and coupling of the tool body 2.1 and the end shank pieces 2.2, 2.3 by deformation. The assembly is secured by at least one screw, preferably by three countersunk screws 2.18 with brass end caps. The latter end caps are provided with a threaded front part, for engaging the threaded end section 2.13 of the axle 2.10. The screws 2.18 are distributed evenly around the circumference of the end shank pieces 2.2, 2.3.

The assembly is kept in tension by means of springs 2.20 previously mounted on the axle 2.10, preferably on both sides adjacent to its center section 2.26 with the greatest diameter. The springs 2.20 are—in this embodiment— clamped between the front sides of the center section 2.26 of the axle and the foremost front sides of the cone sections 2.25 of the end shank pieces 2.2 and 2.3 (as can be seen better in FIG. 5). The springs 2.20 or any other elastic elements with the same characteristics are acting onto the end shank pieces 2.2, 2.3, biasing them with a force acting away from the center section 2.26 of the axle 2.10, and they are located on sections of the axle with a little smaller diameter, adjacent to the center section 2.26, with the threaded sections 2.13 with again smaller diameter, adjacent to the section of the axle 2.10 with the springs 2.20.

Figure 4:
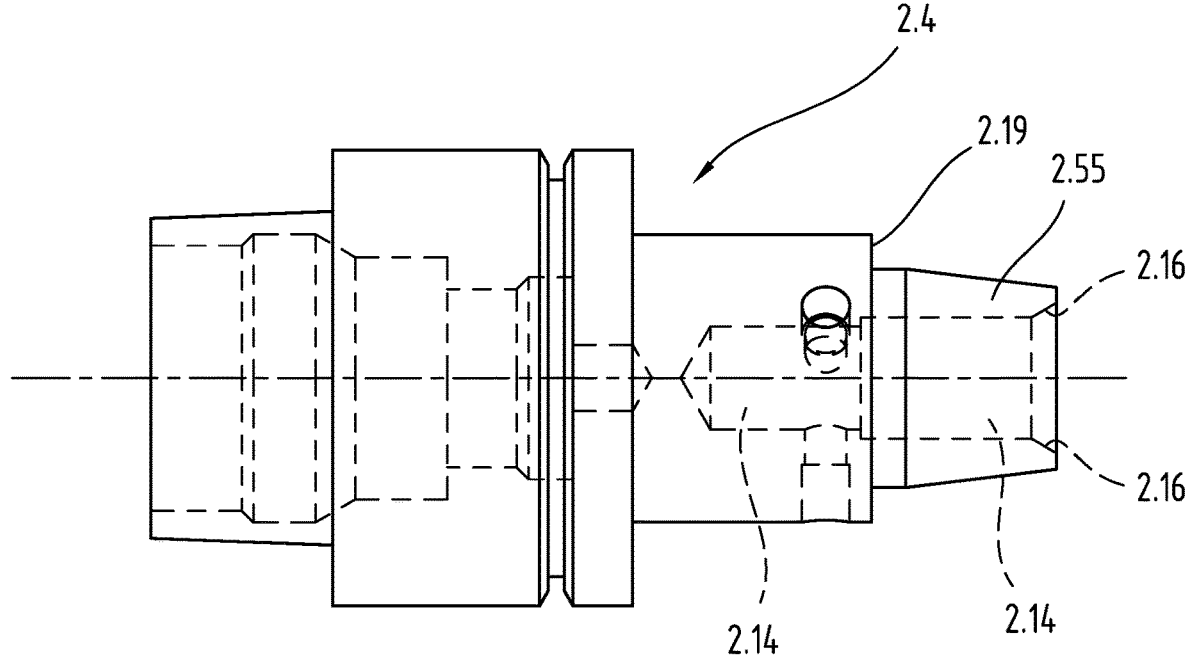
FIG. 4 shows a side view of another embodiment of an end shank piece for a hobbing cutter, for instance for the embodiment of the hob cutter arrangement of FIG. 2.

The end shank piece 2.2, 2.3 can take different forms depending on the machine. For example, the end shank piece 2.2 on the drive side can be an HSK cone 2.4 as shown in FIG. 4, with a cylindrical section for coupling with the machine and a cone section 2.25 built similar to the above- explained end shank piece 2.2. Other variants are for instance a SK cone (not depicted), a simple short or long cone (not depicted), a single or stepped cylinder with one or two drive flats 2.21 (see FIG. 2, right side), or a cone or cylinder (not depicted). On the guide side of the hob cutter arrangement, the end shank piece 2.3 on the guide side can be a simple or stepped cylinder with or without a flat 2.22 (see FIG. 2, left side), a simple short or long cone (not depicted), or a cone or cylinder (not depicted).

The above examples and disclosure are intended to be illustrative and not exhaustive. These examples and description will suggest many variations and alternatives to one of ordinary skill in this art. All these alternatives and variations are intended to be included within the scope of the attached claims. Those familiar with the art may recognize other equivalents to the specific embodiments described herein which equivalents are also intended to be encompassed by the claims attached hereto.

LIST OF REFERENCE SIGNS

1.1 prior art tool body
1.2 prior art drive side tool body—machine interface

1.3 prior art guide side tool body—machine interface
1.4 flat
2.1 tool body
2.2 drive side end shank piece
2.3 guide side end shank piece
2.4 HSK cone
2.5 cutting portion
2.6 axial bore
2.7 bore end section
2.8 bearing face
2.9 test collar
2.10 axle
2.11 insert piece
2.12 axial groove tool body
2.13 threaded section
2.14 blind hole
2.15 drive side center hole
2.16 guide side center hole
2.17 deformable washer
2.18 locking screw
2.19 front face of end shank piece
2.20 spring
2.21 drive side flat
2.22 guide side flat
2.23 end cap of locking screw
2.24 axial groove axle
2.25 centering cone
2.26 center section of axle
2.27 screw for insert piece

The invention claimed is:

1. A hob cutter arrangement with a tool body which is at least partially formed from a cutting material, and which has a continuous axial bore, conical bore sections forming both ends of the axial bore, an end shank body, respectively, at each end of the tool body, adapted for coupling with a hobbing machine, and which has a conical section inserted fittingly into the conical bore section, and which has a radial flange which is configured to be placed against an end face of the tool body when the conical section is seated in the conical bore section, and which the end shank body has a shaft section opposite the conical section for clamping in a machine tool, with an axle connecting the end shank bodies, which is adapted to clamp the end shank bodies together and bias the conical sections into the conical bore sections, and which is provided with at least partly threaded end sections, wherein at least one of the end shank bodies are provided with axial blind holes for insertion of the end sections of the axle, wherein the axle has a central section with an outer diameter smaller than the inner diameter of the central section of the tool body, and at least one circumferential coupling between the axle and the tool body is located in the central section of the tool body, the coupling includes a positive connection with a longitudinal groove in an inner surface of the tool body and a longitudinal ridge on a surface of the axle.

2. The hob cutter arrangement according to claim 1, wherein the longitudinal ridge is formed by an insert piece received in a longitudinal groove of the axle.

3. The hob cutter arrangement according to claim 2, wherein the axle has sections with smaller diameter than the central section and adjacent to the central section, with pressure springs fit onto said sections for acting onto the end shank pieces.

4. The hob cutter arrangement according to claim 3, wherein each end shank piece is provided with at least one locking screw cooperating with a non-threaded portion of the end section of the axle.

5. The hob cutter arrangement according to claim 4, wherein a clamping ring is inserted between the flange of the end shank body and the end of the tool body on each side of the tool body.

6. A hob cutter having a tool body which is at least partially formed from a cutting material, and which has a continuous axial bore, conical bore sections forming both ends of the axial bore, an end shank body at each end of the tool body which is adapted for coupling with a hobbing machine, and the end shank body having a conical section inserted fittingly into the conical bore section of the tool body, a radial flange of the end shank body is configured to be placed against an end face of the tool body when the conical section is seated in the conical bore section, and which the end shank body has a shaft section opposite the conical section for clamping in a machine tool, an axle connecting the end shank bodies is adapted to clamp the end shank bodies together and bias the conical sections into the conical bore sections, wherein at least one of the end shank bodies are provided with axial blind holes for insertion of the end sections of the axle, wherein the axle has a central section with an outer diameter smaller than the inner diameter of the central section of the tool body, and a circumferential coupling between the axle and the tool body, the coupling includes a connection with a longitudinal groove in an inner surface of the tool body and a longitudinal ridge on a surface of the axle.

\* \* \* \* \*